Figure 1:
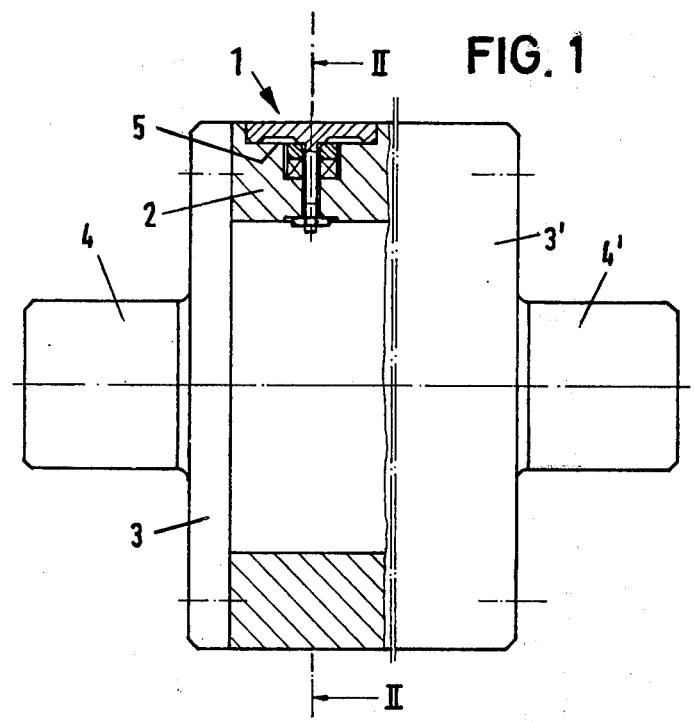

United States Patent [19]

Berger et al.

[11] 4,127,027

[45] Nov. 28, 1978

[54] ARRANGEMENT FOR MEASURING STRESS DISTRIBUTION OVER THE WIDTH OF FLEXIBLE STRIP, MORE PARTICULARLY DURING COLD ROLLING OF STEEL STRIP

[75] Inventors: Bernd Berger, Dusseldorf; Helmut Thies, Kaarst; Gerd Mucke, Mettmann; Eberhard Neuschutz, Ratingen, all of Fed. Rep. of Germany

[73] Assignee: Betriebsforschungsinstitut Vdeh Institut fur Angewandte Forschung GmbH, Dusseldorf, Fed. Rep. of Germany

[21] Appl. No.: 812,520

[22] Filed: Jul. 5, 1977

[30] Foreign Application Priority Data

Jul. 6, 1976 [DE] Fed. Rep. of Germany ....... 2630410

[51] Int. Cl.$^2$ .............................................. G01L 5/10
[52] U.S. Cl. ................................................... 73/144
[58] Field of Search ........................... 73/144, 159, 105

[56] References Cited

U.S. PATENT DOCUMENTS

| | | | |
|---|---|---|---|
| 3,499,306 | 3/1970 | Pearson | 73/159 |
| 3,557,614 | 1/1971 | Muhlberg | 73/144 |
| 3,902,363 | 9/1975 | Ishimoto | 73/144 |
| 4,024,755 | 5/1977 | Quehen | 73/144 |

*Primary Examiner*—Anthony V. Ciarlante
*Attorney, Agent, or Firm*—Holman & Stern

[57] ABSTRACT

An arrangement for measuring stress distribution over the width of a longitudinally moving flexible strip wherein there are provided force transmitters and a deflection measuring roller made up of closely adjacent rings running with the strip under stress and reacting upon said force transmitters, wherein the force transmitters produce parallel switching output signals and rotate in a distortion-free position with said rings which are secured relatively to each other against distortion, the force transmitters being offset peripherally relative to adjacent rings and being connected in parallel circuit groups to a common rotation transmitter for which the output is designed for measurement value processing.

18 Claims, 9 Drawing Figures

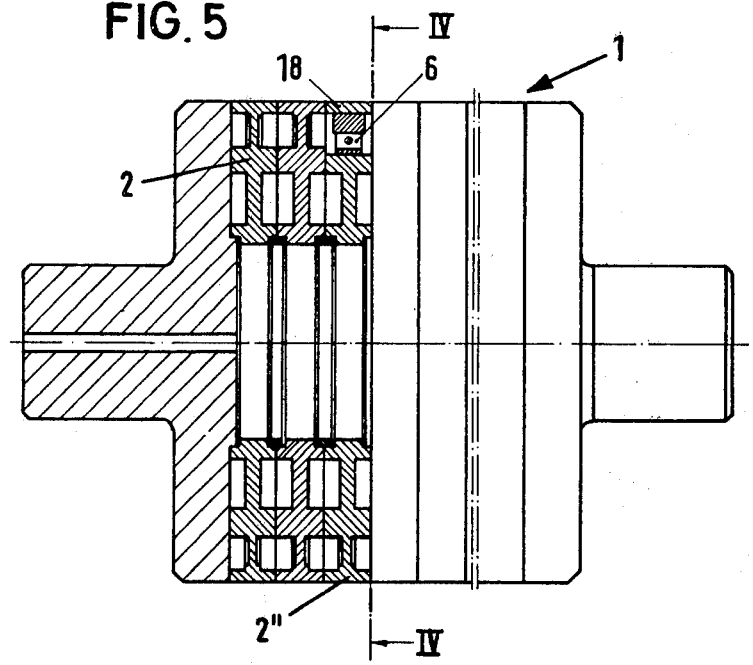
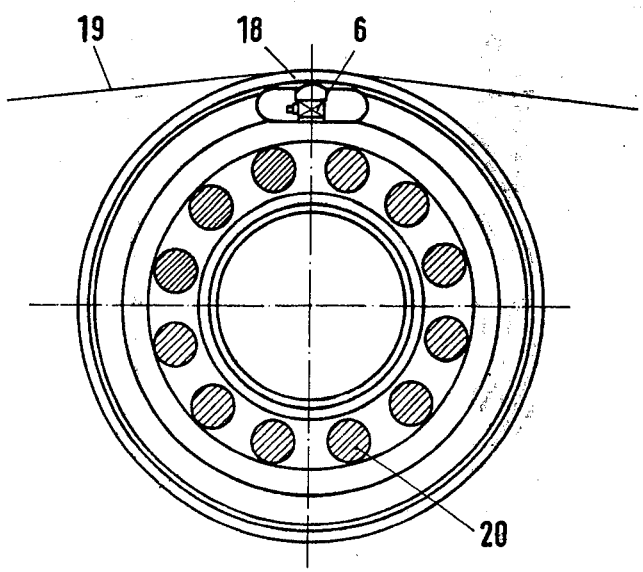

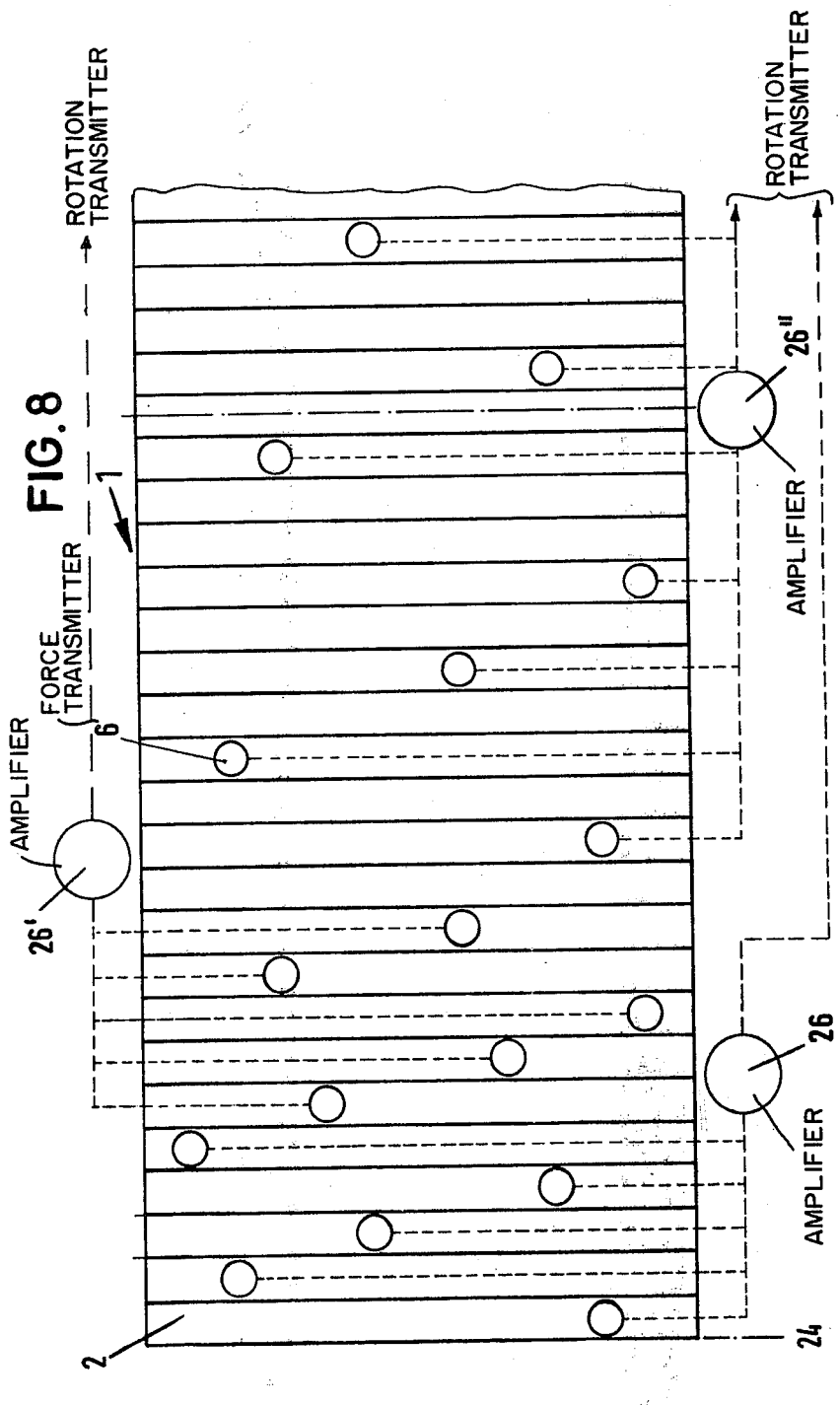

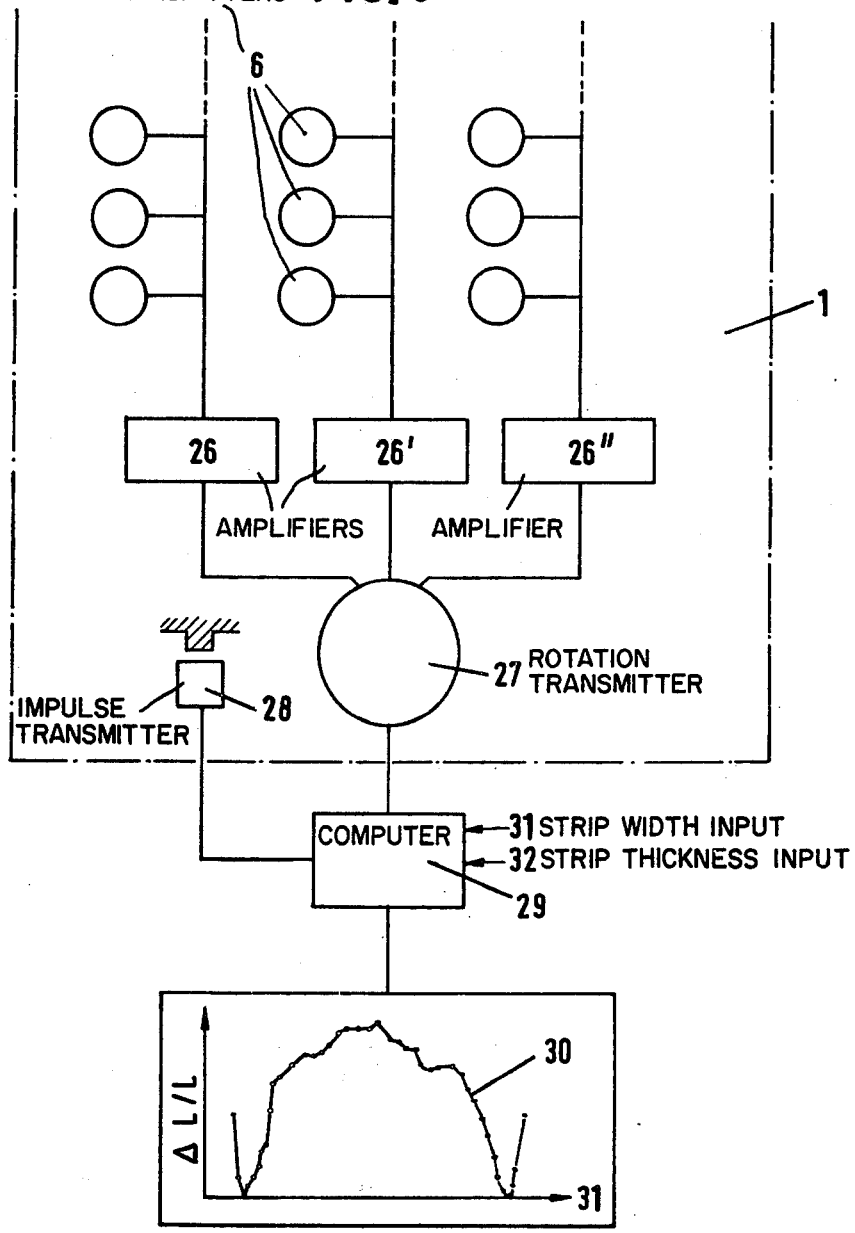

ARRANGEMENT FOR MEASURING STRESS DISTRIBUTION OVER THE WIDTH OF FLEXIBLE STRIP, MORE PARTICULARLY DURING COLD ROLLING OF STEEL STRIP

The invention relates to an arrangement of measuring the stress distribution over the width of flexible strip moving longitudinally, particularly in steel strip during cold rolling, consisting of a deflection roller made up of closely adjacent rings located on bearings and stressed by the deflected strip, so that the stress is transferred to a force transmitter.

Arrangements of this type are known according to DT reg. design No. 69 22 747 as well as a publication in "Stahl und Eisen", 1975 pp. 1051–1056. They serve to determine the length distributions of strips which are translated into stresses in the longitudinally moving strips and thereby give access to the measuring procedure. The relevant relative length fluctuations, which represent more particularly a measure of the waviness, are admittedly very small but their determination is desirable, since the said length fluctuations may be excluded completely or maintained within given limits by modifying the running conditions. In particular a knowledge of the stress distribution allows the determination and elimination of flatness defect, which would otherwise not be determined with sufficient accuracy by means of the length measuring equipment at present available.

In the known arrangements, the rings are arranged as individual components of the deflection roller on ball bearings, which in turn transmit the deviation forces to the non-rotating force transmitters fitted within the support rings of the individual components. In order to achieve comparable measuring results, all force transmitters are arranged side by side in a single axial direction, defined by the vertex of the strip deviation. The force transmitters each have an arm responding to the load, and in turn fitted with strain guages so that the compression forces corresponding to the elongation values may be measured in complete bridge circuits.

Under service conditions such arrangements are frequently subject to breakdown, owing to the extreme cost of measurement value processing. Equally the measuring accuracy thus achieved does not always respond to the job requirements, owing to flexible distortion of the deflection roller itself, thus projecting the accuracy.

On the basis of this situation the purpose of the invention is to improve the arrangement of the type described in the introduction, so as to achieve a greater degree of measuring accuracy, whereby the still considerable equipment structure may be reduced and the complete installation may be less demanding in terms of maintenance.

According to the invention this is achieved in that the force transmitter produces parallel switching output signals rotating with the rings in distortion-free position, the rings being secured against rotation relatively to each other, whereby the force transmitter rings located adjacent to each other are offset peripherally and connected in groups in parallel to a common rotation transmitter having an output designed for processing the measurement values.

The use of force transmitters producing parallel switching output signals on the one hand as well as the distribution of the force transmitters over the jacket surface of the deflection roller on the other hand results firstly in a considerable reduction in equipment costs for signal processing. As the output signals of the force transmitter can be switched in parallel, generally using active transmitters, the processing of a large number of output signals can be effected with a single amplifier. An identical zero signal for all transmitters on an amplifier is of particular advantage to measuring accuracy. Since moving parts between the force transmitter and the strip to be measured are excluded, the measuring accuracy is already considerably greater. The individual force transmitters can be connected to the rings under high pre-stressing since all friction influences with the rings are excluded. This allows the accurate setting of the whole system to an optimum and more particularly linear data range.

A further advantage lies in the fact that in the case of high rigidity of the individual rings a very low inertia moment is achieved for the complete roller. In particular it is possible to dispense with a deflection roller drive and the associated setting problems.

In a preferential design according to the invention the amplifier is connected in the rotating part of the deflection measuring roller between several parallel switched force transmitters and the rotation transmitter.

Several force transmitters can be parallel switched in groups, each group having a rotation transmission connection or an amplifier with rotation transmission connection. As an example 12 force transmitters distributed equally at the peripery of the deflection measuring roller can be connected to a single measuring amplifier.

The rings may be recessed peripherally to receive the force transmitters. The rings can be secured to support rings, in which the force transmitter is fitted so that the loading of the outer ring can be taken into consideration. In this case several rings may also be arranged in common on a single support ring, a fixed connection being maintained between the support ring and the outer rings.

A particularly rigid connection is achieved, in that the deflection measuring roller rings are braced against distortion in relation to each other by means of threaded studs passing axially through the rings or the support rings. In this manner the threaded studs act as tension rods.

The deflection measuring roller is held by means of enclosing end discs with central outwards projecting studs.

Further measurement value processing can be effected directly particularly by means of a micro processor, providing that the sequence in which the individual measurement signals follow and the corresponding measurement points at the periphery of the deflection roller are observed in the processing. Where for instance one amplifier is connected to 12 force transmitters distributed over the periphery of the deflection measuring roller, it is established that further processing of the amplifier output signal will always proceed in the sequence of 1 to 12 according to the relevant locations on the periphery of the deflection measuring roller and consequently the width of the strip. In order to exclude further errors, the deflection measuring roller can nevertheless be fitted with impulse transmitters corresponding to the peripheral distances between the force transmitters, triggering impulses for measurement value processing whenever the relevant force transmitter is under load.

The force transmitters may be hydraulic load cells grouped in a common line with a pressure transformer located inside the deflection measuring roller and transforming the pressure values into electrical signals.

Piezo-crystal type force transmitters are particularly suited, having stress outputs connected in parallel and in groups. It is also possible to use several groups of force transmitters, in which each group has an amplifier or a rotation transmission output. The force transmitters with piezo-crystals already respond at $10^{-2}$ N. As they can be loaded up to approx. 16.5 kN, it is possible to dispense with a safety overload which would only make the installation more expensive.

The small computer connected to the amplifier and rotation transmitter preferably has several inputs for strip thickness and strip width. In this manner it is possible to arrive at a measurement result in which the stress changes in the strip can be shown as relative length fluctuations in relation to strip thickness. This type of measurement result allows more particularly a continuous check and control on operating conditions with a view to uniform stress distribution throughout the whole of the strip width. The use of the position impulses as quoted, additionally to the measurement values and a corresponding input for the position impulses on the small computer allows highly reliable measurement value processing, so that the relevant expense is greatly reduced.

The force transmitters each in two sections and with approximately identical bending moments are preferably set against each other at an angle in the vicinity of 180° in the same direction. This arrangement has the great advantage that distortions to which the deflection measuring roller is subject and producing an opposing stress condition on the side opposing the load can be extensively compensated for. In this manner stress changes in the deflection measuring roller itself practically do not influence the initial stresses of the force transmitter, since they are mainly compensated automatically by the suggested arrangement. Where some twelve force transmitters form a group, a highly satisfactory close distribution of the force transmitters is achieved over the periphery of the deflection measuring roller, whereas the force transmitters can be offset at an angle of 180° for sections of approximately identical bending moment.

Following a group of source transmitters connected to an amplifier, the subsequent group is preferably arranged to ensure a periodic repeat of the first group arrangement. This type of arrangement greatly simplifies the measurement value processing. Finally, the invention allows the conditions in the vicinity of the strip edges to be taken into account in a particularly satisfactory manner. As a result of the very limited space requirements of the force transmitter it is possible to use relatively small rings. As an example a ring width of approx. 25 mm is admissible. In this manner over a considerable total width the deflection measuring roller will pick up with considerably greater accuracy the points at which the strip edges are located, than would otherwise be possible with wider individual rings. Furthermore, the stress fluctuations towards the strip centre are considerably less marked. This allows rings without force transmitters to be used in the central area. Taking a deflection measuring roller measuring 1075 mm wide, the central area over a width of 575 mm may be covered by force transmitters located in every second ring, thus allowing a total of 30 force transmitters, of which 10 at the time are preferably connected to a common measurement amplifier.

Figure 2:
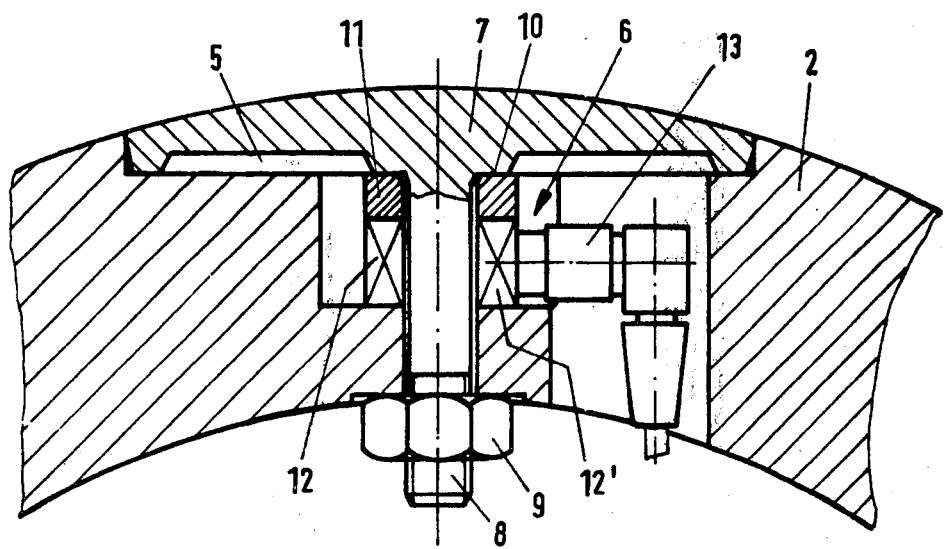
Figure 3:
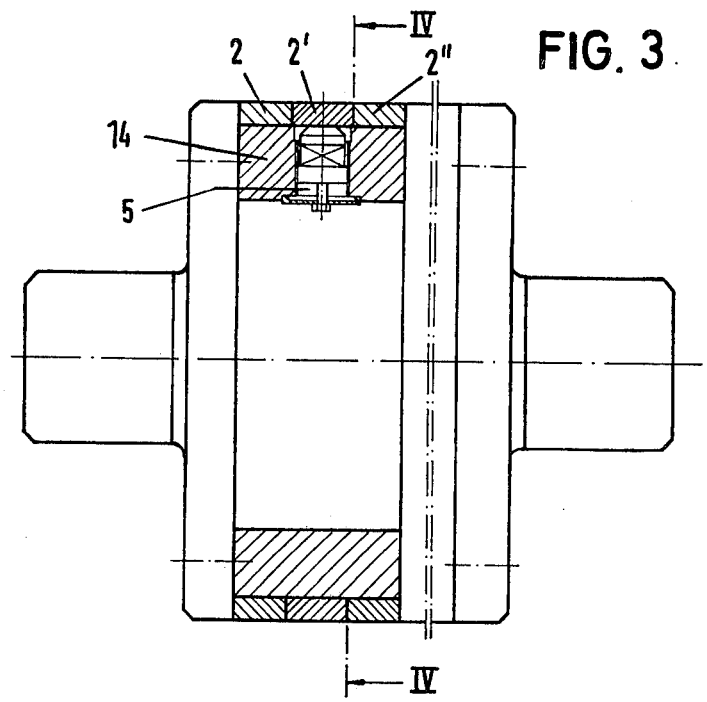
Figure 4:
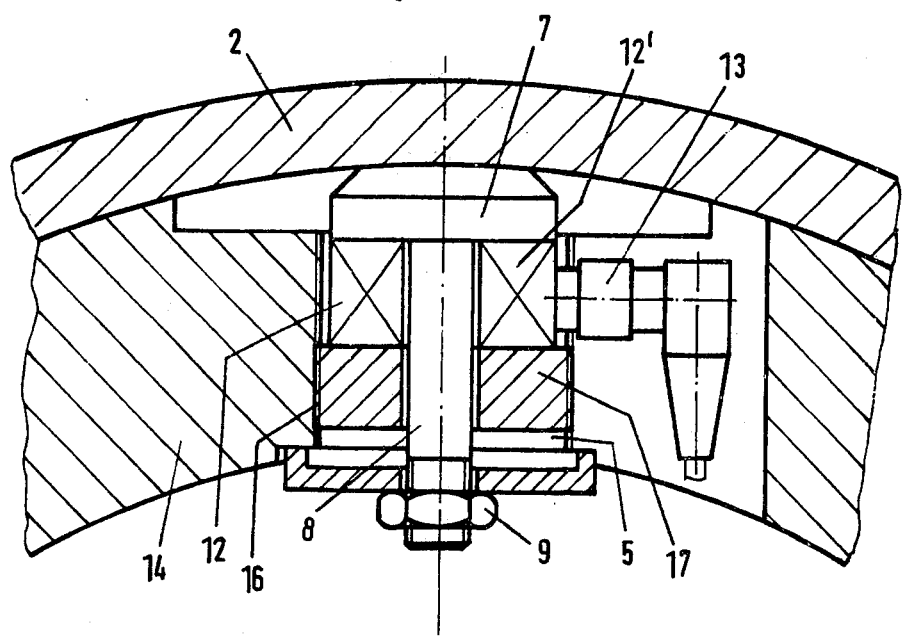
Figure 7:
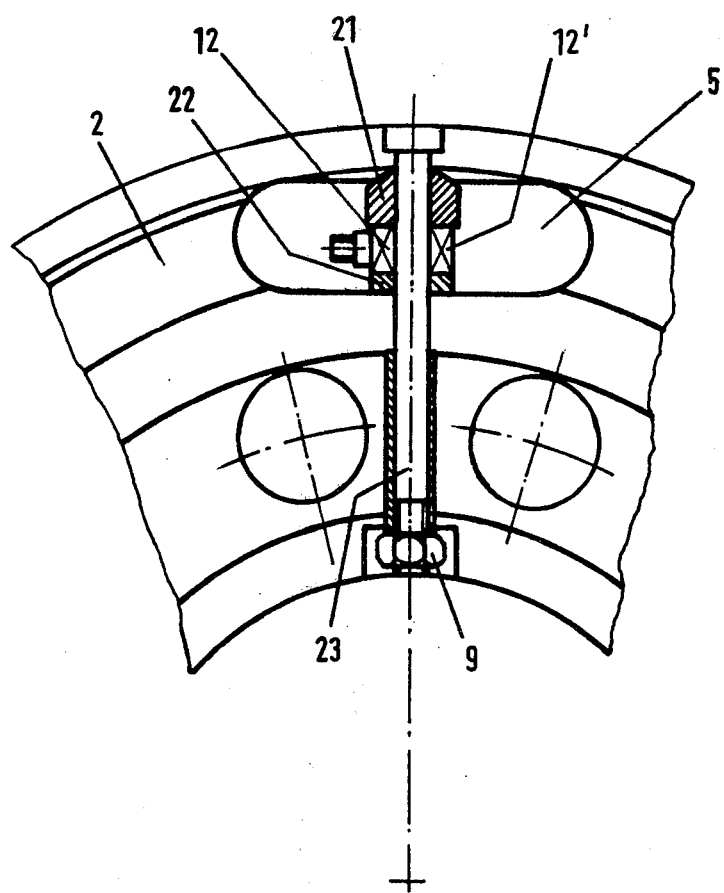

In further illustration of the invention reference is made to partly schematic drawings relating to typical examples, wherein:

FIG. 1 is a part sectional longitudinal view of a deflection measuring roller according to the invention, FIG. 2 is a part section according to section line II—II in FIG. 1, FIG. 3 is another deflection measuring roller according to the invention in partly sectional longitudinal view, FIG. 4 is a partly sectional view along section line IV—IV in FIG. 3, FIG. 5 is a further deflection measuring roller according to the invention in partly sectional longitudinal view, FIG. 6 is a section according to section line VI—VI in FIG. 5, FIG. 7 is a part section of a differing method of fitting the force transmitter, FIG. 8 is a schematic longitudinal view of the distribution of force transmitters over the left-hand half of a deflection measuring roller, and FIG. 9 is a circuit diagram for the relevant deflection measuring roller according to the invention.

The design shown in FIG. 1 features the deflection measuring roller 1 in its two end zones only, with a part section of the left-hand side. The outer left-hand ring 2 is visible, the open side connecting with disc 3, which in turn carries the rotation stub 4. A similar disc 3′ complete with stub 4′ is located on the opposing right-hand side.

The ring 2 has a recess 5 acommodating the force transmitter 6, as enlarged in FIG. 2. The recess 5 has an anchor 7 projecting on the inside of the ring 2 with a threaded stud 8. The nut 9 allows the anchor 7 to be secured in the recess 5, so that the outer face may form a complete assembly with the cylindrical jacket of the ring 2, whereby the inner annular shoulder 10 bears against the annular piezo quartz 12, 12′ by means of pressure components 11. The piezo quartz is fitted with a connecting terminal 13 for transmitting the measuring stress.

In the design shown in FIG. 3, several rings 2, 2′, 2″ are located on a single support ring 14. The outer rings 2, 2′, 2″ are thinner than in the previously described example and respond flexibly to distortion even in the smaller ranges. The recess 5 enclosing the force transmitter is located in the support ring 14, as may be seen in FIG. 4. The carrier component 17 through which passes the threaded stud 8 of anchor 7 is screwed in to an internal thread 16 in recess 5. The anchor 7 in turn operates on the piezo squartz 12, 12′ for which the measuring stress is elected from terminal 13. In this example it is important that the outer surface of the anchor 7 bears directly on the inner surface of the ring 2 and that the recess extends over a sufficient peripheral distance, so that the ring 2 is able to transmit flexible forces to the anchor 7 in the vicinity of the recess. The anchor 7 is secured by means of the nut 9 in the same way as in FIG. 2.

In the designs shown in FIG. 5 and 6 particular emphasis is laid on a deflection measuring roller with a low inertia moment. For this reason the rings 2 are recessed in such a manner that web-like profiles are achieved in section, as indicated by the shaded portion in FIG. 5.

The force transmitter 6 is inserted in an enlarged recess in the ring 2″ in the area of the outer zone as may also be seen in FIG. 6. The outer edge zone of the ring 2" is maintained as a damper web 18 which can be stressed and will transmit a force to the force transmitter 6. The strip 19 thus divides its tension stresses over the width of the power transmitters located across the width of the deflection measuring roller 1 at each deflection vertex. The threaded studs 20 shown in the section in FIG. 6 serve to ensure the bracing of the individual rings.

A different arrangement of the force transmitter is shown in FIG. 7. The piezo quartz 12, 12' is located between a pressure component within the ring 2 and the adjuster component 22, within the recess 5.

Depending on the adjustment of the threaded stud 23 by means of the nuts 9, differing pre-stressing forces can be achieved.

The development of the jacket surface of the deflection roller 1 according to FIG. 8 shows the distribution of pressure transmitters 6, of which part only has been shown for purposes of clarity. In the vicinity of the left-hand edge 24, each individual ring 2 measuring approx. 25 mm wide has a force transmitter. Several force transmitters in sequence form the first group, connected to amplifier 26. The next group of force transmitters is connected to amplifier 26', and the subsequent central group of power transmitters fitted at the rate of one per every second ring, is connected to amplifier 26". Although only part of the power transmitter is illustrated, FIG. 8 nevertheless illustrates the uniform distribution of power transmitters over the periphery of the deflection measuring roller as well as the arrangement of individual force transmitters in relation to the amplifiers 26, 26' and 26" which rotate inside with the deflection measuring roller.

The general arrangement according to FIG. 9 shows that individual groups of force transmitters 6, of which only one is referenced, are connected to amplifiers 26, 26' and 26". These are switched with their output signals to the rotation transmitter 27, which may be a mercury switch for instance. Furthermore the impulse transmitter 28 for the deflection measuring roller 1 and producing the impulses representing the positions of the force transmitter 6 can also be recognised. The amplified measurement signal as well as the impulses are fed to the small computer 29, in which the strip width and the strip thickness 32 is also fed by the means illustrated therein. This allows a representation of the distribution curve 30 for the relative length fluctuations over the strip width 31, as a result of which the operating conditions may be improved in the manner as described.

In order to arrive at further conclusions concerning length fluctuations, the small computer 29 preferably has a further two inputs, of which one receives the steel elasticity modulus, whereas the other takes into account the strip contact angle, as related to the deflection roller and the steel strip. The additional input of this information allows effective determination of the length values from the stresses.

We claim:

1. An arrangement for measuring stress distribution over the width of a longitudinally moving flexible strip comprising a rotatable deflection measuring roller over which the strip is arranged to pass, the roller comprising a plurality of adjacent rings and a plurality of force transmitters, said force transmitters rotating together with said rings and producing parallel switching output signals, the rings being secured relatively to each other against distortion, the force transmitters in adjacent rings being circumferentially offset relative to each other and being connected in parallel circuit groups to a common rotation transmitter having an output which is designed for measurement value processing.

2. An arrangement according to claim 1 wherein that an amplifier is located in the rotating deflection measuring roller between several parallel connected force transmitters and the rotation transmitters.

3. An arrangement according to claim 1 wherein each of several force transmitters are parallel connected in groups, and each group is connected to a terminal of the rotation transmitter.

4. An arrangement according to claim 1 wherein the rings have peripheral recesses to accommodate the force transmitters.

5. An arrangement according to claim 1 wherein the rings are secured to support rings within which the force transmitters are located.

6. An arrangement according to claim 5, wherein several rings are located on a single support ring.

7. An arrangement according to claim 1, wherein the rings of the deflection measuring roller are braced in relation to each other against distortion by threaded studs passing in axial direction through rings or their support rings.

8. An arrangement according to claim 1, wherein the deflection measuring roller consisting of the rings is enclosed on either side by means of discs from which a central stub projects outwards.

9. An arrangement according to claim 1, wherein the deflection measurement roller is also provided with impulse transmitters corresponding to the peripheral clearances of the force transmitters and producing the impulses transmitted to the measurement value processing unit.

10. An arrangement according to claim 1, wherein the force transmitters are hydraulic load cells of which several are connected by means of a common line to a pressure transformer located inside the deflection measuring roller and the pressure values are converted into electrical signals.

11. An arrangement according to claim 1, wherein the force transmitters have piezo-crystals with signal outputs parallel connected at least in groups.

12. An arrangement according to claim 1, wherein a small computer is connected to the rotation transmitter and has further inputs for strip thickness and strip width, and by means of which the strip fluctuations are represented as relative longitudinal fluctuations over the strip width.

13. An arrangement according to claim 12, wherein the small computer also has an input for the position impulses of the deflection measuring roller.

14. An arrangement according to claim 12, wherein the small computer includes input facilities for the steel elasticity modulus of the relevant steel strip, as well as the angle of contact between deflection roller and steel strip.

15. An arrangement according to claim 1, wherein each of two force transmitters in sections with approximately equal bending moments are offset at approximately 180° against each other in the same direction.

16. An arrangement according to claim 15, wherein, following a series of force transmitters grouped and connected to an amplifier, and approximately periodic repeat of the distribution is effected in a further group of force transmitters connected to a further amplifier.

17. An arrangement according to claim 1, wherein less force transmitters are arranged axially in the central area of the deflection measuring roller than in the end zones of the said roller.

18. An arrangement according to claim 1, wherein several or all rings are in monobloc construction.

* * * * *